United States Patent [19]

Stengle, Jr.

[11] 4,246,313
[45] Jan. 20, 1981

[54] HEAT-RESISTANT COMPOSITE MATERIAL AND METHOD OF MAKING SAME

[75] Inventor: Edward J. Stengle, Jr., Toledo, Ohio

[73] Assignee: Owens-Illinois, Inc., Toledo, Ohio

[21] Appl. No.: 2,831

[22] Filed: Jan. 12, 1979

[51] Int. Cl.$^2$ .................. B05D 1/36; B05D 7/24; B32B 27/12; B32B 33/00; C03G 35/00

[52] U.S. Cl. .................. 428/266; 65/374 R; 65/374 RM; 156/280; 427/203; 427/205; 427/387; 428/337; 428/339; 428/457; 428/920

[58] Field of Search .................. 427/203, 205, 387; 428/266, 920, 457, 337, 339; 156/280; 65/374 R, 374 RM

[56] References Cited

U.S. PATENT DOCUMENTS

| | | | |
|---|---|---|---|
| 3,654,058 | 4/1972 | Jasinski et al. | 156/329 |
| 4,070,519 | 1/1978 | Lefkowitz | 428/266 |
| 4,110,095 | 8/1978 | Stengle | 65/26 |

*Primary Examiner*—J. C. Cannon
*Attorney, Agent, or Firm*—E. J. Holler; M. E. Click; D. H. Wilson

[57] ABSTRACT

Composite article, and method of producing same, comprising a heat-resistant woven fabric substrate having a continuous heat and wear-resistant coating thereon for handling hot glass articles and the like without marring same. The heat-resistant flexible composite material is formed from a tightly woven fabric such as thermoset polyaramid fibers with a continuous imperforate coating of organic-inorganic silicone resin containing a filler of heat-resistant particulate material therein adapted to withstand extensive repeated contact with newly-formed hot glass articles. As required, the flexible composite material may be used alone or as a facing for a rigid structural member formed of metal.

26 Claims, No Drawings

HEAT-RESISTANT COMPOSITE MATERIAL AND METHOD OF MAKING SAME

CROSS-REFERENCE TO RELATED APPLICATIONS

A related U.S. patent application is entitled, "Improvements in the Manufacture of Glass Wherein Hot Metal Molds are Provided With a Solid Film Lubricant Layer", Ser. No. 562,554, filed Mar. 27, 1975, now abandoned, and refiled as Ser. No. 727,322, filed September 27, 1976, the latter issued as U.S. Pat. No. 4,110,095 on Aug. 29, 1978, in the name of the same applicant and assigned to the same common assignee as the present application.

BACKGROUND OF THE INVENTION

1. Field of the Invention

This invention generally relates to flexible composite materials which are extremely heat-resistant, and methods of making same, which materials have a continuous layer or coating of solid film lubricant or glass release agent which essentially comprises an organic-inorganic silicone resin having a finely-ground particulate filler therein. The layer or coating is formed by taking an essentially solventless organopolysiloxane resin or mixture of such resins and dispersing a prescribed amount of finely-ground particulate material therein, the combined materials being applied to and heat cured on a woven fibrous substrate comprised of a polymeric thermoset material such as polyaramid fibers or similar high-temperature resistant substrates. The selected substrate after coating may be severed into precisely-sized and shaped contours prior to or subsequent to heat-curing the resin containing the filler material.

The composite material may be fabricated into conveyor belting, sweep arm covering, tong liners, and the like, for handling newly-formed hot glass articles without marring their surfaces or creating objectionable emissions from the composite material due to excessive heat. The coating cures into a thermoset hardened condition on the substrate surface while permitting the substrate to retain an appreciable degree of flexibility. Normally, the polymeric fibrous substrate, while possessing an appreciable amount of heat resistance, cannot be employed alone without a suitable heat-resisting coating for long-term repeated handling of hot glass articles.

2. Description of the Prior Art

It has been common practice in the glass forming art to fabricate or cover conveyor belts for transporting hot glass articles with asbestos or asbestos-containing materials such as transite to provide heat-resistant surfaces which would not mar the glass and provide long term operating life. Also, bucket liners and sweep arm fingers have previously been fabricated with coverings of asbestos cloth for handling hot glass articles.

In the production of glassware, certain handling equipment has also been coated with graphite and petroleum oil swabbing compositions to provide lubricity and heat-resistance. In the use of such coatings, when the petroleum fraction flashes off, it can detract from effective lubrication during forming.

The use of water-based carriers instead of the petroleum oil carriers for graphite and other lubricous materials have not been entirely satisfactory primarily due to the high heat of vaporization of water and the resulting excessive cooling of the glass-handling equipment. In addition, it is difficult to controllably wet the handling equipment surfaces with water-based materials which are applied intermittently during production of glassware.

SUMMARY OF THE INVENTION

The present invention comprises a composite product having a unique combination of materials including a cured hard organopolysiloxane resin containing a filler of non-colloidal lubricating particulate material which is applied over a tightly-woven thick fabric such as thermoset polyaramid fibers. The invention relates to generally flexible composite materials which are extremely heat-resistant, and methods of making same, which materials have at least one continuous layer or coating of solid film lubricant or glass release agent which essentially comprises an organopolysiloxane resin having a finely-ground particulate filler therein. The combined coating constituents are applied over a woven fibrous substrate comprised of a polymeric thermoset material such as polyaramid, and the like, and heat-cured thereon. The substrate may be severed into precisely-sized and shaped contours prior to heat-curing the resin or combined resins containing the filler material for use alone or as a covering over other rigid surfaces. The layer or coating composition is formed of a solid film lubricant or glass release agent which essentially comprises a finely-divided heat-resistant filler dispersed in a solventless thermoset cured, hard organopolysiloxane binder. The layer or coating is formed by introducing the dispersion of fine fillers into an organic solventless solution of a further-curable, thermosettable, solvent-soluble organopolysiloxane resin which is applied over the woven polymeric fibrous substrate and then curing said organopolysiloxane to a thermoset hard condition.

Accordingly, an object of the present invention is to provide an improved hot glass handling base material.

Another object of the present invention is to provide a composite material which provides long-term effectiveness in repeated contact with newly-formed hot glass articles.

Another object of the present invention is to provide improved hot glass handling capability to existing conveyors, scoops, buckets, and the like, by providing a flexible heat-resistant fibrous composite material with a continuous solventless organopolysiloxane coating thereon adapted to cover the glass contacting surfaces of such equipment.

Yet another object of the present invention is to provide a method of making a high heat-resistant composite material which is capable of repeated contact with hot glass articles over an extensive period without deterioration of the material or detrimental marking of the glass articles.

Still another object of the present invention is to provide a heat and wear-resistant woven fabric substrate having a continuous coating of solventless silicone resin and finely-divided filler thereon in cured thermoset hardened condition adapted to long-term repeated handling of hot glass articles.

These and other objects and features of the present invention will become apparant from the following detailed description.

DETAILED DESCRIPTION OF THE PREFERRED EMBODIMENT

The base material upon which the combined layer or coating composition is applied is preferably comprised of polyaramid fibrous yarn, such as commonly manufactured and sold under the trademark "Kevlar" by the E. I. duPont de Nemours & Company. Such polyaramid fibers or yarn are commonly fabricated into a variety of special industrial products exhibiting high modulus of rupture. Among the more significant characteristics of polyaramid yarn are high tensile strength, resistance to combustion and flame retardancy, resistance to stretch, and good surface abrasion resistance. The material is useful over a wide range of temperatures without deterioration or degradation and has a thermal conductivity generally similar to asbestos fibers.

This material has a tensile strength of about $400 \times 10^3$ psi, a density of about 1.4 gm/cm$^3$, a modulus of elasticity of 8.5 MM psi, a percentage elongation of 4.07% at breakage, and a melting or decomposition point of about 930° F. The material can be employed to weave thick fibrous cloth which may be used as conveyor belts and insulating cloth or pads. The material possesses very good thermal resistance, as well as excellent chemical resistance to most common chemicals.

The polyaramid material can be woven into tight belting, as thick as about ¼ inch, with or without a metal wire core for long term use. Various thicknesses of the Kevlar polyaramid fabric can be employed as the substrate. Other materials can be employed as the substrate so long as they possess high temperature resistance to degradation and can be fabricated into interwoven fibrous form. Among such other materials which may be used as the flexible substrate are ceramic fiber cloth such as manufactured by the Carborundum Company, and carbon cloth manufactured by American Kynol, Inc., all of which are comprised of high-temperature resistant fibers or yarn adapted to be fabricated into cloth.

The carbon cloth is essentially a phenolic fiber, known as carbonized Kynol, or Kynol novoloid precursor fiber, which is formed by formaldehyde curing of melt-spun novolac resin. Curing results in the formation of methylol groups, dimethyl ether bonds, and methylene bonds, and because of its three dimensionally croslined structure, the fiber thus obtained is infusible. The fiber is capable of being carbonized directly, without the need for intermediate infusibility treatment.

The ceramic fiber cloth may be comprised of Fiberfrax ceramic fiber which in textile form contains 15 to 25% organic fiber added during the carding process to produce roving. Such textiles have superior insulating ability to 2300° F., and excellent resistance to thermal shock, corrosive attack, and breakdown due to mechanical vibration and stress. They are available from The Carborundum Company. The materials can be double woven to provide exceptional strength and be heat-treated to remove all organics.

The ceramic fiber products are easily able to withstand temperatures as high as 1800° F. Such material in fabric form is able to maintain high tensile strength while resisting thermal shock and abrasion. Such fibers are composed of alumina silica and offer much better dimensional stability than amorphous silica fibers.

Polyaramid fabric, when woven into 3-ply cloth, has properties generally comparable to asbestos cloth as shown by the following table:

| FABRIC | Weight (Oz./yd$^2$) | Thickness (Mills) | Heat Transfer (Cal/cm$^2$ sec) | Temperature Rise (°F.) in 25 sec |
|---|---|---|---|---|
| Polyaramid Fibers | 29.5 | 86 | .163 | 55 |
| Asbestos | 40.7 | 91 | .169 | 56 |

EXAMPLE NO. I

A preferred example of the coating composition which may be employed to coat the aforesaid polyaramid fabric substrate material with a heat and ware-resistant layer to be contacted by the hot glass consists of the following constituents:

| AMOUNT | COMPONENT | CONSTITUENT |
|---|---|---|
| 70 gms | (A) | Reactive Intermediate Silicone Resin GE Product No. SR-191 |
| 30 gms | (B) | Polysiloxane Glass Resin O-I Product No. T-908 Regular |
| 5 gms | (C) | Butylated Melamine-Formaldehyde Resin Koppers Amino Resin 70-10 |
| 20 gms | (D) | Finely-divided Graphite Union Carbide Product No. 38 |
| 5 gms | (E) | Finely-divided Red Iron Oxide Pfizer Product No. R-5098 |

The reactive silicone resin may be described as a methoxy functional, essentially solventless, 100% non-volatile, clear liquid reactive intermediate silicone resin, General Electric Product No. SR-191. It is used as a silicone-polyester copolymer vehicle for heat-cured finishes which are normally applied by coil coating methods to prefinished metal surfaces. It may also be used as a vehicle for paint and other surface coatings. Copolymers of the subject silicone resin and other organic resins can be prepared using conventional resin process techniques and equipment. Copolymer vehicles which are prepared using the subject silicone resin component (A) possess extremely high durability and resistance to loss of gloss, color fade and chalking. Typical properties of the SR-191 silicone resin are:

| Methyoxy Content (Wt %) | 15 |
|---|---|
| Average Combining Weight | 206 |
| Specific Gravity (@ 77° F.) | 1.13 |
| Weight per gallon (lbs) | 9.4 |
| Viscosity - Brookfield (@ 77° F.) | 80 |
| Approximate Number Average Molecular Weight | 600 |

The Owens-Illinois Glass Resin Polymer, Product No. T-908 Regular, Component (B), is an organopolysiloxane resin designed for high temperature laminating applications which require considerable retained flexural strength when the laminate is exposed to elevated temperatures for a prolonged period of time.

The subject organopolysiloxane resins are produced by the co-hydrolysis and co-condensation of different alkoxysilanes employing the steps of: (a) heating the reaction mixture to form a partial condensation product, (b) concentrating this product, (c) precuring the concentrated product, and (d) finally curing the precured product. The resins are useful as machinable, heat-resistant, thermoset bodies or as coatings. The subject resins and processes of making same are disclosed and claimed by U.S. Pat. No. 3,389,121 to Burzynski and Martin, issued June 18, 1968, assigned to the same common assignee as the present invention.

The following properties are typical of flake prepared from Owens-Illinois Glass Resins No. T-908 Regular:

| Weight Loss to Gel | 3–4% |
|---|---|
| Weight Loss Gel to Cure | 3–4% |
| VISCOSITY (BROOKFIELD) | |
| - of 50% solution in xylene (w/w) | 21 cps |
| - of 40% solution in xylene (w/w) | 9 cps |
| - of 30% solution in xylene (w/w) | 5–6 cps |

The flake resin is fully soluble in the following solvents: Benzene, xylene, tetrahydrofuran, acetone, diethyl ether, ethanol, chloroform, and ethylenedichloride.

The Product No. T-908 resin refers to a hardenable thermosettable organpolysiloxane resin solution (60% by weight resin solids in xylene) in which the organic groups are methyl and phenyl siloxane, and wherein the ratio of these organic groups, i.e., the ratio of methyl and phenyl radicals per silicon aton (R:Si ratio) is about 1:4 and wherein the ratio of methyl and phenyl radicals on a mol basis is about 3.3:1, both of these values being based on analyses. The T-908 solid resin is soluble in the liquid SR-191 resin. The T-908 resin in the prepolymer liquid form is also compatible with the SR-191 resin to produce the liquid coating base material.

The cure promoter, Component (C), for the two above-described resins is normally present in an amount less than about 15% by weight based on organopolysiloxane solids. The cure promoters which are employed may be routinely selected by those skilled in the art and are materials which are conventionally employed for curing further-curable organopolysiloxanes. Especially suitable cure promoters which are known for curing organopolysiloxane are the melamine-formaldehyde partial condensate resins, which term refers to alkylated melamine formaldehyde partial condensate resins. The alkylated melamine formaldehyde resins are melamine formaldehyde types in which alkylation is effected with lower alkyl alcohols, or mixtures thereof, such as the $C_1$ and $C_5$ alkalyl alcohols. One such suitable composition, Component (C), is that manufactured by the Koppers Chemical Company as their Amino Resin 70–100 butylated melamine formaldehyde partial condensate resin. When the melamine formaldehyde partial condensation resins are used to promote the curing of the organopolysiloxane, satisfactory results are obtained by using between 0.5% and 1.0% by weight up to about 14% or 15% by weight of the melamine formaldehyde partial condensate resin based on organopolysiloxane solids by weight. Other suitable cure promoters or catalysts include the phosphonic acids such as those disclosed in U.S. Pat. No. 3,654,058, and phenyl phosphonic acid is especially preferred in an amount of about 5% by weight based on the organopolysiloxane. It is not necessary to use a cure promoter in all formulations of the aforesaid resins since desirable results can be obtained both with and without such constituent in the coating composition.

Dry particulate, non-colloidal graphite is intimately combined with the organopolysiloxane resins to form a dispersion of the graphite therein. The weight ratio of the graphite to the organopolysiloxane resin solids in forming the dispersion is preferably on the order of about 0.8:1 to about 2:1. An especially desirable ratio is about 1:1 to about 2:1 with a weight percentage of about 16% being most beneficial. Where greater lubricity is desired in the final cured coating, a higher ratio of graphite to organopolysiloxane resins solids is used. In some cases of the aforesaid example where higher lubricity is desired, up to 25% graphite may be employed. A particularly useful graphite, Component (D), to be employed in the subject coating consists of Union Carbide Product No. 38, manufactured and sold by Union Carbide Chemical Company. In general, such graphite is described as electric furnace, or synthetic, graphite and is supplied as a dry finely-divided particulate material.

The red iron oxide, Component (E), serves as a pigment, in addition to the graphite, for providing both heat-resistance and a glass-release mechanism to the silicone and organopolysiloxane resins. The red iron oxide is normally produced by thermal decomposition of ferrous sulfate under controlled oxidizing conditions, followed by water grinding and washing to eliminate soluble salts. This pigment wets easily, has excellent suspension properties, is chemically stable, and provides a low-cost, very pure refractory oxide material. The red iron oxide is manufactured by Pfizer Minerals Corp., Pigments and Metals Division, as Product No. R-5098. This material is essentially pure $Fe_2O_3$ having a spheroidal particulate shape with a 0.2 percent weight loss on ignition. Also black iron oxide can be used as the pigment. This is Pfizer Product No. BK-5000 which also is essentially pure $Fe_2O_3$ having a cubic particulate shape with no weight loss on ignition.

The above-described coating composition is applied over the fibrous substrate in the form of a continuous imperforate layer by techniques such as brushing. Preferably two or more coatings are applied over the substrate to obtain a thickness of from about 8 to 12 mils as preferred. A coating layer of about 0.45 to 0.50 grams per square inch is especially desirable. The coating layer on the substrate is cured by heating in an air-circulating oven for about one hour at 500° to 600° F., with the higher limit being preferred. Following such curing, the coating is very adherent to the substrate and penetrates the pores and interstices of the fabric very deeply. In the case where organic processing aids are used on the fabric, or on the yarn or roving for making the fabric, longer cure times would be required to eliminate any such organic materials. The fabric exhibits a greater stiffness when coated and the coating is cured to a hardened thermoset condition, but still possesses the property of being generally flexible for use as conveyor belting, and the like. The term "generally flexible" as used herein refers to a coated fabric substrate which is sufficiently flexible for conveyor belting applicable to continuous operation around a pair of six-inch pulleys.

EXAMPLE NO. II

Another example of the coating composition which may be employed to coat the polyaramid fabric substrate material consists of the following:

| AMOUNT | COMPONENT | CONSTITUENT |
|---|---|---|
| 70 gms | (A) | Reactive Intermediate Silicone Resin GE Product No. SR-191 |
| 30 gms | (B) | Polysiloxane Glass Resin O-I Product No. T-908 |

| AMOUNT | COM-PONENT | CONSTITUENT |
|---|---|---|
| | | -continued |
| 20 gms | (D) | Finely-divided Graphite Union Carbide Product No. 38 |

The catalyst is not used in the aforesaid composition; however, adequate curing of the resins is obtained upon heating the coating to about 600° F. for approximately one hour. The resins may still be cured into tough, hardened thermoset condition exhibiting no tackiness.

A thinner woven fabric of polyaramid fibers which is termed "ballistics grade" may also be used as the substrate. Such material is less than about 0.20 inch thick and tightly woven from a continuous filament to resist extremely high impact, being manufactured and sold by Clark-Schwebel Fiber Glass Corp., White Plains, New York. Product No. Kevlar-29 supplied by such manufacturer which is termed a "ballistic fabric" is useful as the fibrous substrate. Such product having a plain weave and designated as Style No. 713 has the following properties:

8.0 oz/sq. yd.
0.014 inch thickness

TENSILE STRENGTH (lbs/sq. inch)

970 Warp
970 Fill

YARN DENIER

1000 Warp
1000 Fill

The coating composition is applied over the fibrous substrate in the form of one or two thin impervious coating layers with the substrate having the desired basic shape or contour. The coated material may be attached by a high-temperature silicone rubber adhesive to a rigid base plate such as a 20 gauge steel plate. The coating on the fabric substrate is then cured, such as by heating the fabric substrate and underlying base plate, at a temperature of about 500° to 550° F. for approximately one hour. The finally-cured composite material on the metallic base plate is adapted to handling hot glass articles over prolonged periods without adverse effects on said articles or the base plate. The base plate may be further shaped such as by bending or punching following applications of the fibrous composite material and curing same thereon.

In installations where a non-conductor for low heat transfer is required, the above-described base plate is particularly desirable for long-term use. The subject base plate is softer than bare metals to provide a cushioning effect when readily deformable hot glass articles are deposited thereon by dropping same through a short vertical distance. The base plate exhibits substantial heat-resistance with minimal wear when contacted repeatedly by newly-formed hot glass articles or molten glass charges. It is possible to create a prescribed pattern of apertures in the base plate for air cooling of such articles without detrimental checks. Such apertures can be formed such as by punching through the composite fibrous substrate and base plate without adverse effects to fabricate an air-cooling dead plate, for example.

EXAMPLE NO. III

With regard to the preferred ranges of constituents to be used in the coating composition, where no catalyst or curing agent is employed, the following table sets forth such ranges in weight percent.

| RANGE | PRE-FERRED | COM-PONENT | CONSTITUENT |
|---|---|---|---|
| 54 to 64% | 56% | (A) | Reactive Intermediate Silicone Resin GE Product No. SR-191 |
| 16 to 30% | 24% | (B) | Polysiloxane Glass Resin O-I Prod. T-908 Regular |
| 14 to 23% | 16% | (D) | Finely-divided Graphite Union Carbide Product No. 38 |
| 0 to 10% (when used) | 4% | (E) | Finely-divided Red Oxide - Pfizer Prod. No. R-5098 |

In formulating the coating composition, the red iron oxide may or may not be used as desired. For some applications, it is useful to include both the graphite and red iron oxide in the coating as pigments, while in other applications, the graphite alone is preferred. The composition is formulated as described in Example No. I with the coating applied to the fibrous substrate and then cured into hardened condition. The fibrous substrate may or may not be backed with a rigid metal plate, depending upon the end use requirements.

The composite material with the subject coating on its glass contacting surface, when permanently attached to a base plate, serves to protect the base material to give it long-term life and endurance. The combined constituents of the top coating provide good lubricity with low friction and excellent heat-resistance for repeated direct contact with hot glass. The composite material is adapted to supporting hot glass articles without marring or marking of the glass substrate, nor resulting in any pick up of residue which could deleteriously affect the appearance or structural strength of the glass articles. The coating is fully cured into a solidified thermoset condition and has no tackiness to detract from its usefulness over a wide range of elevated temperature applications. The silicone and organopolysiloxane resin constituents being essentially solventless do not emit vaporized solvents or create any other deleterious emissions in use as part of the composite material.

Various modifications may be resorted to within the spirit and scope of the appended claims.

I claim:

1. A heat-resistant flexible composite material adapted to handling hot glass articles, and the like, comprising a tightly interwoven fabric substrate formed from fibers selected from the group consisting of organic polyaramid fibers, inorganic ceramic fibers and carbon fibers, and a continuous heat-hardened coating of organic-inorganic polysiloxane resin having a finely-divided filler of heat-resistant particulate material therein extending over the glass-contacting surface of said substrate.

2. The composite material in accordance with claim 1, wherein said interwoven fabric substrate consists of thermoset polyaramid fibers.

3. The composite material in accordance with claim 1, wherein said organic-inorganic polysiloxane resin comprises an essentially solventless non-volatile intermediate silicone resin which is heat-resistant upon curing.

4. The composite material in accordance with claim 1, wherein said filler consists of finely-ground particulate material selected from the group consisting of carbon, graphite and iron oxide.

5. The composite material in accordance with claim 1, wherein said filler of heat-resistant particulate material comprises a mixture of finely-ground graphite and iron oxide.

6. The composite material in accordance with claim 1, wherein said filler of heat-resistant particulate material is present in an amount ranging from about 14 to 33 weight percent of said resin coating.

7. The composite material in accordance with claim 1, wherein said woven fabric consists of thermoset polyaramid fiber cloth having a thickness of not less than about 0.014 inch and said continuous coating deeply penetrates and covers the glass contacting surface of said woven fabric substrate.

8. The composite material in accordance with claim 1, wherein said continuous coating consists of an imperforate layer deeply penetrating the fabric substrate having a thickness ranging from about 8 to 12 mils.

9. The composite material in accordance with claim 1, wherein said filler of heat-resistant particulate material comprises finely-ground graphite.

10. The composite material in accordance with claim 1, wherein said filler of heat-resistant particulate material comprises finely-ground high-melting metallic oxide.

11. The composite material in accordance with claim 1, wherein said organic-inorganic polysiloxane resin comprises an essentially-solventless silicone resin which is substantially hardened following heat-curing of said resin.

12. The composite material in accordance with claim 1, wherein said continuous coating is applied in the form of at least two separate layers prior to heat-curing of said resin to deeply penetrate the said substrate and retain appreciable flexibility of said fabric substrate.

13. The composite material in accordance with claim 1, wherein said resin is capable of being cured at a temperature of about 500° to 600° for a period of about one hour.

14. A heat-resistant flexible composite material adapted to use as conveyor belting, and the like, for handling newly-formed hot glass articles comprising a woven fabric substrate of substantial thickness consisting of tightly interwoven thermoset polyaramid fibers, and a continuous coating of essentially solventless silicone resin and an organic-inorganic polysiloxane resin having a filler of heat-resistant fine particulate material dispersed therein which is heat cured onto said substrate, said filler being selected from the group consisting of graphite, carbon and iron oxide.

15. A heat-resistant flexible composite material adapted to use in handling newly-formed hot glass articles, and the like, comprising a woven fabric substrate of substantial thickness consisting of tightly interwoven thermoset polyaramid fibers, and a continuous heat-cured coating of the following composition deposited on the glass-contacting surface of said substrate:

54 to 64 wt %—Methoxy Functional Reactive Intermediate Silicone Resin
16 to 30 wt %—Organic-Inorganic Polysiloxane Resin
14 to 23 wt %—Finely Divided Graphite
0 to 10 wt %—Finely Divided Iron Oxide.

16. A heat-resistant generally-flexible composite material adapted to use in handling newly-formed hot glass articles comprising a woven fabric substrate of tightly interwoven thermoset polyaramid fibers, and a continuous heat-cured coating of the following composition deposited on the glass-contacting surface of said substrate:

56 wt %—Methoxy Functional Reactive Intermediate Silicone Resin
24 wt %—Organic-Inorganic Polysiloxane Glass Resin
16 wt %—Finely-divided Graphite
4 wt %—Finely-Divided Red Iron Oxide.

17. The heat-resistant composite material in accordance with claim 16, wherein said woven fabric substrate bearing said coating is adhered to a rigid metallic backing material.

18. The heat-resistant composite material in accordance with claim 16, wherein said woven fabric substrate is adhered with a high-temperature resistant adhesive material to a rigid metallic backing material adapted to further working such as punching, bending and the like.

19. The process of making a flexible composite material adapted to long-term use for handling hot glass articles, and the like, comprising the steps of taking a substrate of tightly woven fabric of thermoset polyaramid fibers of substantial thickness, applying a continuous coating of essentially solventless silicone resin having a heat-resistant filler therein uniformly over the glass-contacting surface of said substrate, and heating the filler-containing silicone resin coating and substrate to cure said resin and permanently affix the same to said fabric substrate.

20. The process of making a flexible composite material in accordance with claim 19, wherein said filler-containing resin coating and substrate are heated at a temperature ranging from about 500° to 600° F. for a period of about one hour.

21. A process of making a flexible composite material in accordance with claim 19, wherein said least two separate layers of said continuous coating are applied successively to said substrate prior to heat-curing to ensure deep penetration of said coating into said substrate.

22. The process of making a flexible composite material adapted to long-term use for handling hot glass articles in accordance with claim 19, including the step of initially serving the woven fabric substrate to prescribed size and shape prior to applying and heat-curing of said coating thereon.

23. The process of making a flexible composite material adapted to long-term use for handling hot glass articles in accordance with claim 19, wherein said essentially solventless silicone resin comprises a non-volatile methoxy functional intermediate silicone resin.

24. The process of making a flexible composite material adapted to long-term use for handling hot glass articles in accordance with claim 19, wherein said heat-resistant filler consists of at least one finely-ground particulate material selected from the group consisting of graphite, carbon and high-melting metallic oxide.

25. The process of making a heat-resistant generally flexible composite material adapted to long-term use in handling hot glass articles, and the like, comprising the steps of severing to size and shape a substrate of tightly interwoven fabric of thermoset polyaramid fibers, applying at least one continuous coating of an essentially solventless methoxy functional intermediate silicone resin and an organic-inorganic polysiloxane resin having a finely-ground heat-resistant filler dispersed therein deposited uniformly as a thin layer over the glass-contacting surface of said fabric substrate to deeply penetrate the interstices between said fibers, and heat-curing the filler-containing resinous resin coating on said fabric substrate to permanently affix the same thereto.

26. The process of making a heat-resistant composite material in accordance with claim 25, including the step of adhereing said woven fabric substrate to a rigid metallic backing material with a high-temperature resistant adhesive material, and applying said continuous coating of intermediate silicone resin and polysiloxane resin to said fabric substrate.

* * * * *